(12) United States Patent
Zuback (10) Patent No.: US 8,758,621 B2
(45) Date of Patent: Jun. 24, 2014

(54) PROCESS AND APPARATUS FOR PURIFYING IMPURE WATER USING MICROFILTRATION OR ULTRAFILTRATION IN COMBINATION WITH REVERSE OSMOSIS

(75) Inventor: Joseph Edward Zuback, Camarillo, CA (US)

(73) Assignee: Evoqua Water Technologies LLC, Alpharetta, GA (US)

( * ) Notice: Subject to any disclaimer, the term of this patent is extended or adjusted under 35 U.S.C. 154(b) by 0 days.

(21) Appl. No.: 10/599,350

(22) PCT Filed: Mar. 24, 2005

(86) PCT No.: PCT/IB2005/051007
§ 371 (c)(1),
(2), (4) Date: Sep. 26, 2006

(87) PCT Pub. No.: WO2005/092799
PCT Pub. Date: Oct. 6, 2005

(65) Prior Publication Data
US 2007/0181496 A1     Aug. 9, 2007

(30) Foreign Application Priority Data

Mar. 26, 2004   (AU) .............................. 2004901665

(51) Int. Cl.
| | |
|---|---|
| *B01D 65/02* | (2006.01) |
| *C02F 1/44* | (2006.01) |
| *B01D 61/02* | (2006.01) |
| *B01D 61/14* | (2006.01) |
| *B01D 61/58* | (2006.01) |

(52) U.S. Cl.
CPC ............... *B01D 65/02* (2013.01); *C02F 1/441* (2013.01); *C02F 1/444* (2013.01); *B01D 61/025* (2013.01); *B01D 61/145* (2013.01); *B01D 61/147* (2013.01); *B01D 61/58* (2013.01); *B01D 2321/04* (2013.01); *B01D 2321/168* (2013.01)
USPC ........... 210/636; 210/650; 210/652; 210/649; 210/641; 210/106; 210/108; 210/321.69; 210/332; 210/331.01; 210/407; 210/409; 210/411; 210/416.1; 210/416.3; 210/806

(58) Field of Classification Search
CPC ..................... B01D 2321/04; B01D 2321/168; B01D 61/025; B01D 61/145; B01D 61/147; B01D 61/58; B01D 65/02; C02F 1/441; C02F 1/444
USPC ............... 210/636, 641, 806, 321.69, 333.01, 210/649–652, 106, 108, 332, 407, 409, 411, 210/416.1, 416.3
See application file for complete search history.

(56) References Cited

U.S. PATENT DOCUMENTS

| | | | |
|---|---|---|---|
| 256,008 | A | 4/1882 | Leak |
| 285,321 | A | 9/1883 | Tams |

(Continued)

FOREIGN PATENT DOCUMENTS

| | | | |
|---|---|---|---|
| AU | 34400/84 | A | 4/1985 |
| AU | 55847/86 | A | 9/1986 |

(Continued)

OTHER PUBLICATIONS

Wikipedia, "Seawater," available at http://en.wikipedia.org/wiki/Seawater, Jul. 15, 2007.*

(Continued)

*Primary Examiner* — Lore Jarrett
*Assistant Examiner* — Benjamin J Behrendt (57) ABSTRACT

A method of purifying impure water contaminated with a filterable impurity and a dissolved impurity, such as seawater, comprising the steps of: providing impure water to a primary microfiltration or ultrafiltration unit to remove the filterable impurity and produce impure filtered water contaminated with a dissolved impurity; providing the impure filtered water contaminated with a dissolved impurity to a reverse osmosis unit to produce a potable water stream and a residual reverse osmosis stream; and treating the residual reverse osmosis stream prior to reuse. The treatment may be in the form of passing through a secondary filter (such as another microfiltration or ultrafiltration membrane or a cartridge filter, and the subsequently treated reverse osmosis reject may be used to backwash the microfiltration or ultrafiltration unit.

25 Claims, 1 Drawing Sheet

(56) References Cited

U.S. PATENT DOCUMENTS

| | | |
|---|---|---|
| 511,995 A | 1/1894 | Buckley |
| 1,997,074 A | 4/1935 | Novotny |
| 2,080,783 A | 5/1937 | Petersen |
| 2,105,700 A | 1/1938 | Ramage |
| 2,843,038 A | 7/1958 | Manspeaker |
| 2,926,086 A | 2/1960 | Chenicek et al. |
| 3,068,655 A | 12/1962 | Murray et al. |
| 3,139,401 A | 6/1964 | Hach |
| 3,183,191 A | 5/1965 | Hach |
| 3,191,674 A | 6/1965 | Richardson |
| 3,198,636 A | 8/1965 | Bouthilet |
| 3,228,876 A | 1/1966 | Mahon |
| 3,275,554 A | 9/1966 | Wagenaar |
| 3,442,002 A | 5/1969 | Geary et al. |
| 3,462,362 A | 8/1969 | Kollsman |
| 3,472,168 A | 10/1969 | Inoue et al. |
| 3,472,765 A | 10/1969 | Budd et al. |
| 3,492,698 A | 2/1970 | Geary et al. |
| 3,501,798 A | 3/1970 | Carraro |
| 3,505,215 A * | 4/1970 | Bray .................... 210/636 |
| 3,556,305 A | 1/1971 | Shorr |
| 3,563,860 A | 2/1971 | Henderyckx |
| 3,591,010 A | 7/1971 | Pall et al. |
| 3,625,827 A | 12/1971 | Wildi et al. |
| 3,654,147 A | 4/1972 | Levin |
| 3,679,052 A | 7/1972 | Asper |
| 3,693,406 A | 9/1972 | Tobin, III |
| 3,700,561 A | 10/1972 | Ziffer |
| 3,700,591 A | 10/1972 | Higley |
| 3,708,071 A | 1/1973 | Crowley |
| 3,728,256 A | 4/1973 | Cooper |
| 3,763,055 A | 10/1973 | White et al. |
| 3,791,631 A | 2/1974 | Meyer |
| 3,795,609 A * | 3/1974 | Hall et al. ............. 210/636 |
| 3,804,258 A | 4/1974 | Okuniewski et al. |
| 3,843,809 A | 10/1974 | Luck |
| 3,876,738 A | 4/1975 | Marinaccio et al. |
| 3,912,624 A | 10/1975 | Jennings |
| 3,955,998 A | 5/1976 | Clampitt et al. |
| 3,968,192 A | 7/1976 | Hoffman, III et al. |
| 3,982,095 A | 9/1976 | Robinson |
| 3,992,301 A | 11/1976 | Shippey et al. |
| 3,993,816 A | 11/1976 | Baudet et al. |
| 4,049,765 A | 9/1977 | Yamazaki |
| 4,076,656 A | 2/1978 | White et al. |
| 4,082,683 A | 4/1978 | Galesloot |
| 4,105,556 A * | 8/1978 | O'Amaddio et al. ........ 210/206 |
| 4,105,731 A | 8/1978 | Yamazaki |
| 4,107,043 A | 8/1978 | McKinney |
| 4,138,460 A | 2/1979 | Tigner |
| 4,157,899 A | 6/1979 | Wheaton |
| 4,183,890 A | 1/1980 | Bollinger |
| 4,188,817 A | 2/1980 | Steigelmann |
| 4,190,411 A | 2/1980 | Fujimoto |
| 4,190,419 A | 2/1980 | Bauer |
| 4,192,750 A | 3/1980 | Elfes et al. |
| 4,193,780 A | 3/1980 | Cotton, Jr. et al. |
| 4,203,848 A | 5/1980 | Grandine, II |
| 4,204,961 A | 5/1980 | Cusato, Jr. |
| 4,218,324 A | 8/1980 | Hartmann et al. |
| 4,226,921 A | 10/1980 | Tsang |
| 4,227,295 A | 10/1980 | Bodnar et al. |
| 4,230,583 A | 10/1980 | Chiolle et al. |
| 4,243,525 A | 1/1981 | Greenberg |
| 4,247,498 A | 1/1981 | Castro |
| 4,248,648 A | 2/1981 | Kopp |
| 4,253,936 A | 3/1981 | Leysen et al. |
| 4,271,026 A | 6/1981 | Chen et al. |
| 4,272,379 A | 6/1981 | Pollock |
| 4,302,336 A | 11/1981 | Kawaguchi et al. |
| 4,315,819 A | 2/1982 | King et al. |
| 4,323,453 A | 4/1982 | Zampini |
| 4,340,479 A | 7/1982 | Pall |
| 4,350,592 A | 9/1982 | Kronsbein |
| 4,353,802 A | 10/1982 | Hara et al. |
| 4,359,359 A | 11/1982 | Gerlach et al. |
| 4,367,139 A | 1/1983 | Graham |
| 4,367,140 A | 1/1983 | Wilson |
| 4,369,605 A | 1/1983 | Opersteny et al. |
| 4,371,427 A | 2/1983 | Holler et al. |
| 4,384,474 A | 5/1983 | Kowalski |
| 4,385,150 A | 5/1983 | Miyake et al. |
| 4,388,189 A | 6/1983 | Kawaguchi et al. |
| 4,389,363 A | 6/1983 | Molthop |
| 4,405,688 A | 9/1983 | Lowery et al. |
| 4,407,975 A | 10/1983 | Yamaguchi |
| 4,414,113 A | 11/1983 | LaTerra |
| 4,414,172 A | 11/1983 | Leason |
| 4,415,452 A | 11/1983 | Heil et al. |
| 4,431,545 A | 2/1984 | Pall et al. |
| 4,451,369 A | 5/1984 | Sekino et al. |
| 4,462,855 A | 7/1984 | Yankowsky et al. |
| 4,467,001 A | 8/1984 | Coplan et al. |
| 4,476,015 A | 10/1984 | Schmitt et al. |
| 4,476,112 A | 10/1984 | Aversano |
| 4,491,522 A | 1/1985 | Ishida et al. |
| 4,496,470 A | 1/1985 | Kapiloff et al. |
| 4,511,471 A | 4/1985 | Muller |
| 4,519,909 A | 5/1985 | Castro |
| 4,539,940 A | 9/1985 | Young |
| 4,540,490 A | 9/1985 | Shibata et al. |
| 4,545,862 A | 10/1985 | Gore et al. |
| 4,547,289 A | 10/1985 | Okano et al. |
| 4,609,465 A | 9/1986 | Miller |
| 4,610,789 A | 9/1986 | Barch |
| 4,614,109 A | 9/1986 | Hofmann |
| 4,623,460 A | 11/1986 | Kuzumoto et al. |
| 4,623,670 A | 11/1986 | Mutoh et al. |
| 4,629,563 A | 12/1986 | Wrasidlo |
| 4,632,745 A | 12/1986 | Giuffrida et al. |
| 4,636,296 A | 1/1987 | Kunz |
| 4,642,182 A | 2/1987 | Drori |
| 4,647,377 A | 3/1987 | Miura |
| 4,650,586 A | 3/1987 | Ellis, III |
| 4,650,596 A | 3/1987 | Schlueter et al. |
| 4,656,865 A | 4/1987 | Callan |
| 4,660,411 A | 4/1987 | Reid |
| 4,666,543 A | 5/1987 | Kawano |
| 4,670,145 A | 6/1987 | Edwards |
| 4,673,507 A | 6/1987 | Brown |
| 4,687,561 A | 8/1987 | Kunz |
| 4,687,578 A | 8/1987 | Stookey |
| 4,688,511 A | 8/1987 | Gerlach et al. |
| 4,689,191 A | 8/1987 | Beck et al. |
| 4,702,830 A | 10/1987 | Makino et al. |
| 4,702,836 A | 10/1987 | Mutoh et al. |
| 4,702,840 A | 10/1987 | Degen et al. |
| 4,707,266 A | 11/1987 | Degen et al. |
| 4,708,799 A | 11/1987 | Gerlach et al. |
| 4,718,270 A | 1/1988 | Storr |
| 4,744,240 A | 5/1988 | Reichelt |
| 4,749,487 A | 6/1988 | Lefebvre |
| 4,756,875 A | 7/1988 | Tajima et al. |
| 4,763,612 A | 8/1988 | Iwanami |
| 4,767,539 A | 8/1988 | Ford |
| 4,769,140 A | 9/1988 | van Dijk et al. |
| 4,774,132 A | 9/1988 | Joffee et al. |
| 4,775,471 A | 10/1988 | Nagai et al. |
| 4,779,448 A | 10/1988 | Gogins |
| 4,781,831 A | 11/1988 | Goldsmith |
| 4,784,771 A | 11/1988 | Wathen et al. |
| 4,793,932 A | 12/1988 | Ford et al. |
| 4,797,187 A | 1/1989 | Davis et al. |
| 4,797,211 A | 1/1989 | Ehrfeld et al. |
| 4,800,019 A | 1/1989 | Bikson et al. |
| 4,810,384 A | 3/1989 | Fabre |
| 4,812,235 A | 3/1989 | Seleman et al. |
| 4,816,160 A | 3/1989 | Ford et al. |
| 4,824,563 A | 4/1989 | Iwahori et al. |
| 4,834,998 A | 5/1989 | Shrikhande |
| 4,839,048 A | 6/1989 | Reed et al. |
| 4,840,227 A | 6/1989 | Schmidt |
| 4,846,970 A | 7/1989 | Bertelsen et al. |
| 4,867,883 A | 9/1989 | Daigger et al. |

(56) References Cited

U.S. PATENT DOCUMENTS

| | | | |
|---|---|---|---|
| 4,876,006 A | 10/1989 | Ohkubo et al. | |
| 4,876,012 A | 10/1989 | Kopp et al. | |
| 4,886,601 A | 12/1989 | Iwatsuka et al. | |
| 4,888,115 A | 12/1989 | Marinaccio et al. | |
| 4,889,620 A | 12/1989 | Schmit et al. | |
| 4,904,426 A | 2/1990 | Lundgard et al. | |
| 4,908,114 A | 3/1990 | Ayers | |
| 4,919,815 A | 4/1990 | Copa et al. | |
| 4,921,610 A | 5/1990 | Ford et al. | |
| 4,931,186 A | 6/1990 | Ford et al. | |
| 4,933,084 A | 6/1990 | Bandel et al. | |
| 4,935,143 A | 6/1990 | Kopp et al. | |
| 4,952,317 A | 8/1990 | Culkin | |
| 4,963,304 A | 10/1990 | Im et al. | |
| 4,966,699 A | 10/1990 | Sasaki et al. | |
| 4,968,430 A | 11/1990 | Hildenbrand et al. | |
| 4,968,733 A | 11/1990 | Muller et al. | |
| 4,969,997 A | 11/1990 | Kluver et al. | |
| 4,980,066 A | 12/1990 | Slegers | |
| 4,988,444 A | 1/1991 | Applegate et al. | |
| 4,999,038 A | 3/1991 | Lundberg | |
| 5,002,666 A | 3/1991 | Matsumoto et al. | |
| 5,005,430 A | 4/1991 | Kibler et al. | |
| 5,015,275 A | 5/1991 | Beck et al. | |
| 5,024,762 A | 6/1991 | Ford et al. | |
| 5,034,125 A | 7/1991 | Karbachsch et al. | |
| 5,043,113 A | 8/1991 | Kafchinski et al. | |
| 5,059,317 A * | 10/1991 | Marius et al. | 210/202 |
| 5,066,375 A | 11/1991 | Parsi et al. | |
| 5,066,401 A | 11/1991 | Muller et al. | |
| 5,066,402 A | 11/1991 | Anselme et al. | |
| 5,069,065 A | 12/1991 | Sprunt et al. | |
| 5,069,353 A | 12/1991 | Espenan | |
| 5,075,044 A | 12/1991 | Augem | |
| 5,075,065 A | 12/1991 | Effenberger et al. | |
| 5,076,925 A | 12/1991 | Roesink et al. | |
| 5,079,272 A | 1/1992 | Allegrezza, Jr. et al. | |
| 5,080,770 A | 1/1992 | Culkin | |
| 5,094,750 A | 3/1992 | Kopp et al. | |
| 5,094,867 A | 3/1992 | Detering et al. | |
| 5,098,567 A | 3/1992 | Nishiguchi | |
| 5,102,550 A | 4/1992 | Pizzino et al. | |
| 5,104,535 A | 4/1992 | Cote et al. | |
| 5,104,546 A | 4/1992 | Filson et al. | |
| H1045 H | 5/1992 | Wilson | |
| 5,135,663 A | 8/1992 | Newberth, III et al. | |
| 5,137,631 A | 8/1992 | Eckman et al. | |
| 5,138,870 A | 8/1992 | Lyssy | |
| 5,147,553 A | 9/1992 | Waite | |
| 5,151,191 A | 9/1992 | Sunaoka et al. | |
| 5,151,193 A | 9/1992 | Grobe et al. | |
| 5,156,738 A | 10/1992 | Maxson | |
| 5,158,721 A | 10/1992 | Allegrezza, Jr. et al. | |
| 5,169,528 A | 12/1992 | Karbachsch et al. | |
| 5,169,530 A | 12/1992 | Schucker et al. | |
| 5,180,407 A | 1/1993 | DeMarco | |
| 5,182,019 A | 1/1993 | Cote et al. | |
| 5,186,821 A | 2/1993 | Murphy | |
| 5,192,442 A | 3/1993 | Piccirillo et al. | |
| 5,192,456 A | 3/1993 | Ishida et al. | |
| 5,192,478 A | 3/1993 | Caskey | |
| 5,194,149 A | 3/1993 | Selbie et al. | |
| 5,198,116 A | 3/1993 | Comstock et al. | |
| 5,198,162 A | 3/1993 | Park et al. | |
| 5,203,405 A | 4/1993 | Gentry et al. | |
| 5,209,852 A | 5/1993 | Sunaoka et al. | |
| 5,211,823 A | 5/1993 | Giuffrida et al. | |
| 5,221,478 A | 6/1993 | Dhingra et al. | |
| 5,227,063 A | 7/1993 | Langerak et al. | |
| 5,244,579 A * | 9/1993 | Horner et al. | 210/652 |
| 5,248,424 A | 9/1993 | Cote et al. | |
| 5,262,054 A | 11/1993 | Wheeler | |
| 5,269,919 A | 12/1993 | von Medlin | |
| 5,271,830 A | 12/1993 | Faivre et al. | |
| 5,275,766 A | 1/1994 | Gadkaree et al. | |
| 5,286,324 A | 2/1994 | Kawai et al. | |
| 5,290,451 A | 3/1994 | Koster et al. | |
| 5,290,457 A | 3/1994 | Karbachsch et al. | |
| 5,297,420 A | 3/1994 | Gilliland et al. | |
| 5,316,671 A | 5/1994 | Murphy | |
| 5,320,760 A | 6/1994 | Freund et al. | |
| 5,353,630 A | 10/1994 | Soda et al. | |
| 5,354,470 A | 10/1994 | Seita et al. | |
| 5,358,732 A | 10/1994 | Seifter et al. | |
| 5,361,625 A | 11/1994 | Ylvisaker | |
| 5,364,527 A | 11/1994 | Zimmermann et al. | |
| 5,364,529 A | 11/1994 | Morin et al. | |
| 5,374,353 A | 12/1994 | Murphy | |
| 5,389,260 A | 2/1995 | Hemp et al. | |
| 5,393,433 A | 2/1995 | Espenan et al. | |
| 5,396,019 A | 3/1995 | Sartori et al. | |
| 5,401,401 A | 3/1995 | Hickok et al. | |
| 5,401,405 A | 3/1995 | McDougald | |
| 5,403,479 A | 4/1995 | Smith et al. | |
| 5,405,528 A | 4/1995 | Selbie et al. | |
| 5,411,663 A | 5/1995 | Johnson | |
| 5,417,101 A | 5/1995 | Weich | |
| 5,419,816 A | 5/1995 | Sampson et al. | |
| 5,425,415 A | 6/1995 | Master et al. | |
| 5,451,317 A | 9/1995 | Ishida et al. | |
| 5,458,779 A | 10/1995 | Odegaard | |
| 5,468,397 A | 11/1995 | Barboza et al. | |
| 5,470,469 A | 11/1995 | Eckman | |
| 5,477,731 A | 12/1995 | Mouton | |
| 5,479,590 A | 12/1995 | Lin | |
| 5,480,553 A | 1/1996 | Yamamori et al. | |
| 5,482,625 A | 1/1996 | Shimizu et al. | |
| 5,484,528 A | 1/1996 | Yagi et al. | |
| 5,490,939 A | 2/1996 | Gerigk et al. | 210/652 |
| 5,491,023 A | 2/1996 | Tsai et al. | |
| 5,501,798 A * | 3/1996 | Al-Samadi et al. | 210/652 |
| 5,525,220 A | 6/1996 | Yagi et al. | |
| 5,531,848 A | 7/1996 | Brinda et al. | |
| 5,531,900 A | 7/1996 | Raghavan et al. | |
| 5,543,002 A | 8/1996 | Brinda et al. | |
| 5,552,047 A | 9/1996 | Oshida et al. | |
| 5,554,283 A | 9/1996 | Brinda et al. | |
| 5,556,591 A | 9/1996 | Jallerat et al. | |
| 5,575,963 A | 11/1996 | Soffer et al. | |
| 5,597,732 A | 1/1997 | Bryan-Brown | |
| 5,607,593 A | 3/1997 | Cote et al. | |
| 5,626,755 A | 5/1997 | Keyser et al. | |
| 5,629,084 A | 5/1997 | Moya | |
| 5,633,163 A | 5/1997 | Cameron | |
| 5,639,373 A | 6/1997 | Mahendran et al. | |
| 5,643,455 A | 7/1997 | Kopp et al. | |
| 5,647,988 A | 7/1997 | Kawanishi et al. | |
| 5,670,053 A | 9/1997 | Collentro et al. | |
| 5,677,360 A | 10/1997 | Yamamori et al. | |
| 5,688,460 A | 11/1997 | Ruschke | |
| 5,690,830 A | 11/1997 | Ohtani et al. | |
| 5,733,456 A | 3/1998 | Okey et al. | |
| 5,744,037 A | 4/1998 | Fujimura et al. | |
| 5,747,605 A | 5/1998 | Breant et al. | |
| 5,766,479 A | 6/1998 | Collentro et al. | |
| D396,046 S | 7/1998 | Scheel et al. | |
| 5,783,083 A | 7/1998 | Henshaw et al. | |
| D396,726 S | 8/1998 | Sadr et al. | |
| 5,814,234 A | 9/1998 | Bower et al. | |
| D400,890 S | 11/1998 | Gambardella | |
| 5,843,069 A | 12/1998 | Butler et al. | |
| 5,846,424 A | 12/1998 | Khudenko | |
| 5,846,425 A | 12/1998 | Whiteman | |
| 5,871,823 A | 2/1999 | Anders et al. | |
| 5,888,401 A | 3/1999 | Nguyen | |
| 5,895,521 A | 4/1999 | Otsuka et al. | |
| 5,895,570 A | 4/1999 | Liang | |
| 5,906,739 A | 5/1999 | Osterland et al. | |
| 5,906,742 A | 5/1999 | Wang et al. | |
| 5,910,250 A | 6/1999 | Mahendran et al. | |
| 5,914,039 A | 6/1999 | Mahendran et al. | |
| 5,918,264 A | 6/1999 | Drummond et al. | |
| 5,942,113 A | 8/1999 | Morimura | |
| 5,944,997 A | 8/1999 | Pedersen et al. | |

(56) References Cited

U.S. PATENT DOCUMENTS

| | | |
|---|---|---|
| 5,951,878 A | 9/1999 | Astrom |
| 5,958,243 A | 9/1999 | Lawrence et al. |
| 5,961,830 A | 10/1999 | Barnett |
| 5,968,357 A | 10/1999 | Doelle et al. |
| 5,988,400 A | 11/1999 | Karachevtcev et al. |
| 5,989,428 A | 11/1999 | Goronszy |
| 5,997,745 A | 12/1999 | Tonelli et al. ............ 210/652 |
| 6,001,254 A | 12/1999 | Espenan et al. |
| 6,007,712 A | 12/1999 | Tanaka et al. |
| 6,017,451 A | 1/2000 | Kopf |
| 6,024,872 A | 2/2000 | Mahendran et al. |
| 6,036,030 A | 3/2000 | Stone et al. |
| 6,039,872 A | 3/2000 | Wu et al. |
| 6,042,677 A | 3/2000 | Mahendran et al. |
| 6,045,698 A | 4/2000 | Cote et al. |
| 6,045,899 A | 4/2000 | Wang et al. |
| 6,048,454 A | 4/2000 | Jenkins |
| 6,048,455 A | 4/2000 | Janik |
| 6,066,401 A | 5/2000 | Stilburn |
| 6,071,404 A | 6/2000 | Tsui |
| 6,074,718 A | 6/2000 | Puglia et al. |
| 6,077,435 A | 6/2000 | Beck et al. |
| 6,083,393 A | 7/2000 | Wu et al. |
| 6,096,213 A | 8/2000 | Radovanovic et al. |
| 6,113,782 A | 9/2000 | Leonard |
| 6,120,688 A * | 9/2000 | Daly et al. ............ 210/650 |
| 6,126,819 A | 10/2000 | Heine et al. |
| 6,146,747 A | 11/2000 | Wang et al. |
| 6,149,817 A | 11/2000 | Peterson et al. |
| 6,156,200 A | 12/2000 | Zha et al. |
| 6,159,373 A | 12/2000 | Beck et al. |
| 6,162,020 A | 12/2000 | Kondo |
| 6,193,890 B1 | 2/2001 | Pedersen et al. |
| 6,202,475 B1 | 3/2001 | Selbie et al. |
| 6,214,231 B1 | 4/2001 | Cote et al. |
| 6,214,232 B1 | 4/2001 | Baurmeister et al. |
| 6,217,770 B1 | 4/2001 | Haney et al. |
| 6,221,247 B1 | 4/2001 | Nemser et al. |
| 6,245,239 B1 | 6/2001 | Cote et al. |
| 6,254,773 B1 | 7/2001 | Biltoft |
| 6,264,839 B1 | 7/2001 | Mohr et al. |
| 6,277,512 B1 | 8/2001 | Hamrock et al. |
| 6,280,626 B1 | 8/2001 | Miyashita et al. |
| 6,284,135 B1 | 9/2001 | Ookata |
| 6,290,756 B1 | 9/2001 | Macheras et al. |
| 6,294,039 B1 | 9/2001 | Mahendran et al. |
| 6,299,773 B1 | 10/2001 | Takamura et al. |
| 6,303,026 B1 | 10/2001 | Lindbo |
| 6,303,035 B1 | 10/2001 | Cote et al. |
| 6,315,895 B1 | 11/2001 | Summerton et al. |
| 6,319,411 B1 | 11/2001 | Cote |
| 6,322,703 B1 | 11/2001 | Taniguchi et al. |
| 6,324,898 B1 | 12/2001 | Cote et al. |
| 6,325,928 B1 | 12/2001 | Pedersen et al. |
| 6,325,938 B1 | 12/2001 | Miyashita et al. |
| 6,331,248 B1 | 12/2001 | Taniguchi et al. |
| 6,337,018 B1 | 1/2002 | Mickols |
| RE37,549 E | 2/2002 | Mahendran et al. |
| 6,349,835 B1 * | 2/2002 | Saux et al. ............ 210/427 |
| 6,354,444 B1 | 3/2002 | Mahendran et al. |
| 6,361,695 B1 | 3/2002 | Husain et al. |
| 6,368,819 B1 | 4/2002 | Gaddy et al. |
| 6,372,138 B1 | 4/2002 | Cho et al. |
| 6,375,848 B1 | 4/2002 | Cote et al. |
| 6,383,369 B2 | 5/2002 | Elston |
| 6,387,189 B1 | 5/2002 | Groschl et al. |
| 6,402,955 B2 | 6/2002 | Ookata |
| 6,406,629 B1 | 6/2002 | Husain et al. |
| 6,423,214 B1 | 7/2002 | Lindbo |
| 6,423,784 B1 | 7/2002 | Hamrock et al. |
| 6,432,310 B1 | 8/2002 | Andou et al. |
| 6,440,303 B2 | 8/2002 | Spriegel |
| D462,699 S | 9/2002 | Johnson et al. |
| 6,444,124 B1 | 9/2002 | Onyeche et al. |
| 6,468,430 B1 | 10/2002 | Kimura et al. |
| 6,471,869 B1 | 10/2002 | Yanou et al. |
| 6,485,645 B1 | 11/2002 | Husain et al. |
| 6,495,041 B2 | 12/2002 | Taniguchi et al. |
| 6,517,723 B1 | 2/2003 | Daigger et al. |
| 6,524,481 B2 | 2/2003 | Zha et al. |
| 6,524,733 B1 | 2/2003 | Nonobe |
| 6,550,747 B2 | 4/2003 | Rabie et al. |
| 6,555,005 B1 | 4/2003 | Zha et al. |
| 6,562,237 B1 | 5/2003 | Olaopa |
| 6,576,136 B1 | 6/2003 | De Moel et al. |
| 6,592,762 B2 | 7/2003 | Smith |
| D478,913 S | 8/2003 | Johnson et al. |
| 6,613,222 B2 | 9/2003 | Mikkelson et al. |
| 6,620,319 B2 | 9/2003 | Behmann et al. |
| 6,623,643 B2 | 9/2003 | Chisholm et al. |
| 6,627,082 B2 | 9/2003 | Del Vecchio et al. |
| 6,632,358 B1 | 10/2003 | Suga et al. |
| 6,635,179 B1 | 10/2003 | Summerton et al. |
| 6,641,733 B2 | 11/2003 | Zha et al. |
| 6,645,374 B2 | 11/2003 | Cote et al. |
| 6,656,356 B2 | 12/2003 | Gungerich et al. |
| 6,682,652 B2 | 1/2004 | Mahendran et al. |
| 6,685,832 B2 | 2/2004 | Mahendran et al. |
| 6,696,465 B2 | 2/2004 | Dellaria et al. |
| 6,702,561 B2 | 3/2004 | Stillig et al. |
| 6,706,185 B2 | 3/2004 | Goel et al. |
| 6,706,189 B2 | 3/2004 | Rabie et al. |
| 6,708,957 B2 | 3/2004 | Cote et al. |
| 6,712,970 B1 | 3/2004 | Trivedi |
| 6,721,529 B2 | 4/2004 | Chen et al. |
| 6,723,242 B1 | 4/2004 | Ohkata et al. |
| 6,723,758 B2 | 4/2004 | Stone et al. |
| 6,727,305 B1 | 4/2004 | Pavez Aranguiz |
| 6,743,362 B1 | 6/2004 | Porteous et al. |
| 6,755,970 B1 | 6/2004 | Knappe et al. |
| 6,758,972 B2 | 7/2004 | Vriens et al. |
| 6,761,826 B2 | 7/2004 | Bender |
| 6,770,202 B1 | 8/2004 | Kidd et al. |
| 6,780,466 B2 | 8/2004 | Grangeon et al. |
| 6,783,008 B2 | 8/2004 | Zha et al. |
| 6,790,347 B2 | 9/2004 | Jeong et al. |
| 6,790,912 B2 | 9/2004 | Blong |
| 6,805,806 B2 | 10/2004 | Arnaud |
| 6,808,629 B2 | 10/2004 | Wouters-Wasiak et al. |
| 6,811,696 B2 | 11/2004 | Wang et al. |
| 6,814,861 B2 | 11/2004 | Husain et al. |
| 6,821,420 B2 | 11/2004 | Zha et al. |
| 6,830,782 B2 | 12/2004 | Kanazawa |
| 6,840,251 B2 | 1/2005 | Gill et al. |
| 6,841,070 B2 | 1/2005 | Zha et al. |
| 6,861,466 B2 | 3/2005 | Dadalas et al. |
| 6,863,816 B2 | 3/2005 | Austin et al. |
| 6,863,817 B2 | 3/2005 | Liu et al. |
| 6,863,818 B2 | 3/2005 | Daigger et al. |
| 6,863,823 B2 | 3/2005 | Cote |
| 6,869,534 B2 | 3/2005 | McDowell et al. |
| 6,872,305 B2 | 3/2005 | Johnson et al. |
| 6,881,343 B2 | 4/2005 | Rabie et al. |
| 6,884,350 B2 | 4/2005 | Muller |
| 6,884,375 B2 | 4/2005 | Wang et al. |
| 6,890,435 B2 | 5/2005 | Ji et al. |
| 6,890,645 B2 | 5/2005 | Disse et al. |
| 6,893,568 B1 | 5/2005 | Janson et al. |
| 6,899,812 B2 | 5/2005 | Cote et al. |
| 6,936,085 B2 | 8/2005 | DeMarco |
| 6,946,073 B2 | 9/2005 | Daigger et al. |
| 6,952,258 B2 | 10/2005 | Ebert et al. |
| 6,955,762 B2 | 10/2005 | Gallagher et al. |
| 6,962,258 B2 | 11/2005 | Zha et al. |
| 6,964,741 B2 | 11/2005 | Mahendran et al. |
| 6,969,465 B2 | 11/2005 | Zha et al. |
| 6,974,554 B2 | 12/2005 | Cox et al. |
| 6,994,867 B1 | 2/2006 | Hossainy et al. |
| 7,005,100 B2 | 2/2006 | Lowell |
| 7,014,763 B2 | 3/2006 | Johnson et al. |
| 7,018,530 B2 | 3/2006 | Pollock |
| 7,018,533 B2 | 3/2006 | Johnson et al. |
| 7,022,233 B2 | 4/2006 | Chen |
| 7,041,728 B2 | 5/2006 | Zipplies et al. |

(56) References Cited

U.S. PATENT DOCUMENTS

| | | |
|---|---|---|
| 7,052,610 B2 | 5/2006 | Janson et al. |
| 7,083,733 B2 | 8/2006 | Freydina et al. |
| 7,087,173 B2 | 8/2006 | Cote et al. |
| 7,122,121 B1 | 10/2006 | Ji |
| 7,147,777 B1 | 12/2006 | Porteous |
| 7,147,778 B1 | 12/2006 | DiMassimo et al. |
| 7,160,455 B2 | 1/2007 | Taniguchi et al. |
| 7,160,463 B2 | 1/2007 | Beck et al. |
| 7,160,464 B2 | 1/2007 | Lee et al. |
| 7,172,699 B1 | 2/2007 | Trivedi et al. |
| 7,172,701 B2 | 2/2007 | Gaid et al. |
| 7,186,344 B2 | 3/2007 | Hughes |
| 7,208,091 B2 | 4/2007 | Pind et al. |
| 7,223,340 B2 | 5/2007 | Zha et al. |
| 7,226,541 B2 | 6/2007 | Muller et al. |
| 7,247,238 B2 | 7/2007 | Mullette et al. |
| 7,264,716 B2 | 9/2007 | Johnson et al. |
| 7,279,100 B2 | 10/2007 | Devine |
| 7,279,215 B2 | 10/2007 | Hester et al. |
| 7,300,022 B2 | 11/2007 | Muller |
| 7,314,563 B2 | 1/2008 | Cho et al. |
| 7,329,344 B2 | 2/2008 | Jordan et al. |
| 7,344,645 B2 | 3/2008 | Beck et al. |
| 7,361,274 B2 | 4/2008 | Lazaredes |
| 7,378,024 B2 | 5/2008 | Bartels et al. |
| 7,387,723 B2 | 6/2008 | Jordan |
| 7,404,896 B2 | 7/2008 | Muller |
| 7,410,584 B2 | 8/2008 | Devine |
| 7,455,765 B2 | 11/2008 | Elefritz et al. |
| 7,481,933 B2 | 1/2009 | Barnes |
| 7,507,274 B2 | 3/2009 | Tonkovich et al. |
| 7,510,655 B2 | 3/2009 | Barnes |
| 7,531,042 B2 | 5/2009 | Murkute et al. |
| 7,563,363 B2 | 7/2009 | Kuzma |
| 7,591,950 B2 | 9/2009 | Zha et al. |
| 7,632,439 B2 | 12/2009 | Mullette et al. |
| 7,648,634 B2 | 1/2010 | Probst |
| 7,662,212 B2 | 2/2010 | Mullette et al. |
| 7,708,887 B2 | 5/2010 | Johnson et al. |
| 7,713,413 B2 | 5/2010 | Barnes |
| 7,718,057 B2 | 5/2010 | Jordan et al. |
| 7,718,065 B2 | 5/2010 | Jordan |
| 7,722,769 B2 | 5/2010 | Jordan et al. |
| 7,761,826 B1 | 7/2010 | Thanvantri et al. |
| 7,819,956 B2 | 10/2010 | Muller |
| 7,850,851 B2 | 12/2010 | Zha et al. |
| 7,862,719 B2 | 1/2011 | McMahon et al. |
| 7,931,463 B2 | 4/2011 | Cox et al. |
| 7,938,966 B2 | 5/2011 | Johnson |
| 2001/0047962 A1 | 12/2001 | Zha et al. |
| 2001/0052494 A1 | 12/2001 | Cote et al. |
| 2002/0027111 A1 | 3/2002 | Ando et al. |
| 2002/0070157 A1 | 6/2002 | Yamada |
| 2002/0117444 A1 | 8/2002 | Mikkelson et al. |
| 2002/0148767 A1 | 10/2002 | Johnson et al. |
| 2002/0153313 A1 | 10/2002 | Cote |
| 2002/0185435 A1 | 12/2002 | Husain et al. |
| 2002/0189999 A1 | 12/2002 | Espenan et al. |
| 2002/0195390 A1 | 12/2002 | Zha et al. |
| 2003/0038080 A1 | 2/2003 | Vriens et al. |
| 2003/0042199 A1 | 3/2003 | Smith |
| 2003/0052055 A1 | 3/2003 | Akamatsu et al. |
| 2003/0056919 A1 | 3/2003 | Beck |
| 2003/0057155 A1 | 3/2003 | Husain et al. |
| 2003/0062301 A1 | 4/2003 | Merrie et al. |
| 2003/0075495 A1 | 4/2003 | Dannstrom et al. |
| 2003/0075504 A1 | 4/2003 | Zha et al. |
| 2003/0121855 A1 | 7/2003 | Kopp |
| 2003/0127388 A1 | 7/2003 | Ando et al. |
| 2003/0146153 A1 | 8/2003 | Cote et al. |
| 2003/0150807 A1 | 8/2003 | Bartels et al. |
| 2003/0159988 A1 | 8/2003 | Daigger et al. |
| 2003/0178365 A1 | 9/2003 | Zha et al. |
| 2003/0196955 A1* | 10/2003 | Hughes ............ 210/650 |
| 2003/0226797 A1 | 12/2003 | Phelps |
| 2003/0234221 A1 | 12/2003 | Johnson et al. |
| 2004/0007523 A1 | 1/2004 | Gabon et al. |
| 2004/0007525 A1 | 1/2004 | Rabie et al. |
| 2004/0035770 A1 | 2/2004 | Edwards et al. |
| 2004/0045893 A1 | 3/2004 | Watanabe et al. |
| 2004/0050791 A1 | 3/2004 | Herczeg |
| 2004/0055974 A1 | 3/2004 | Del Vecchio et al. |
| 2004/0084369 A1 | 5/2004 | Zha et al. |
| 2004/0108268 A1 | 6/2004 | Liu et al. |
| 2004/0112831 A1 | 6/2004 | Rabie et al. |
| 2004/0139992 A1 | 7/2004 | Murkute et al. |
| 2004/0145076 A1 | 7/2004 | Zha et al. |
| 2004/0149655 A1 | 8/2004 | Petrucco et al. |
| 2004/0154671 A1 | 8/2004 | Martins et al. |
| 2004/0168978 A1 | 9/2004 | Gray |
| 2004/0168979 A1 | 9/2004 | Zha et al. |
| 2004/0173525 A1 | 9/2004 | Hunniford et al. |
| 2004/0178154 A1 | 9/2004 | Zha et al. |
| 2004/0188341 A1 | 9/2004 | Zha et al. |
| 2004/0211726 A1 | 10/2004 | Baig et al. |
| 2004/0217053 A1 | 11/2004 | Zha et al. |
| 2004/0222158 A1 | 11/2004 | Husain et al. |
| 2004/0232076 A1 | 11/2004 | Zha et al. |
| 2004/0238442 A1 | 12/2004 | Johnson et al. |
| 2004/0245174 A1 | 12/2004 | Takayama et al. |
| 2005/0006308 A1 | 1/2005 | Cote et al. |
| 2005/0023219 A1 | 2/2005 | Kirker et al. |
| 2005/0029185 A1 | 2/2005 | Muller |
| 2005/0029186 A1 | 2/2005 | Muller |
| 2005/0032982 A1 | 2/2005 | Muller |
| 2005/0045557 A1 | 3/2005 | Daigger et al. |
| 2005/0053878 A1 | 3/2005 | Bruun et al. |
| 2005/0061725 A1 | 3/2005 | Liu et al. |
| 2005/0077227 A1 | 4/2005 | Kirker et al. |
| 2005/0098494 A1 | 5/2005 | Mullette et al. |
| 2005/0103722 A1 | 5/2005 | Freydina et al. |
| 2005/0109692 A1 | 5/2005 | Zha et al. |
| 2005/0115880 A1 | 6/2005 | Pollock |
| 2005/0115899 A1 | 6/2005 | Liu et al. |
| 2005/0121389 A1 | 6/2005 | Janson et al. |
| 2005/0126963 A1 | 6/2005 | Phagoo et al. |
| 2005/0139538 A1 | 6/2005 | Lazaredes |
| 2005/0184008 A1 | 8/2005 | Schacht et al. |
| 2005/0194305 A1 | 9/2005 | Vido et al. |
| 2005/0194310 A1 | 9/2005 | Yamamoto et al. |
| 2005/0194315 A1 | 9/2005 | Adams et al. |
| 2005/0258098 A1 | 11/2005 | Vincent et al. |
| 2006/0000775 A1 | 1/2006 | Zha et al. |
| 2006/0021929 A1 | 2/2006 | Mannheim et al. |
| 2006/0065596 A1 | 3/2006 | Kent et al. |
| 2006/0081533 A1 | 4/2006 | Khudenko |
| 2006/0131234 A1 | 6/2006 | Zha et al. |
| 2006/0201876 A1 | 9/2006 | Jordan |
| 2006/0201879 A1 | 9/2006 | Den Boestert et al. |
| 2006/0249448 A1 | 11/2006 | Fujishima et al. |
| 2006/0249449 A1 | 11/2006 | Nakhla et al. |
| 2006/0261007 A1 | 11/2006 | Zha et al. |
| 2006/0273007 A1 | 12/2006 | Zha et al. |
| 2006/0273038 A1 | 12/2006 | Syed et al. |
| 2007/0007205 A1 | 1/2007 | Johnson et al. |
| 2007/0007207 A1 | 1/2007 | Mahendran et al. |
| 2007/0007214 A1 | 1/2007 | Zha et al. |
| 2007/0039888 A1 | 2/2007 | Ginzburg et al. |
| 2007/0045183 A1 | 3/2007 | Murphy |
| 2007/0051679 A1 | 3/2007 | Adams et al. |
| 2007/0056904 A1 | 3/2007 | Hogt et al. |
| 2007/0056905 A1 | 3/2007 | Beck et al. |
| 2007/0075017 A1 | 4/2007 | Kuzma |
| 2007/0075021 A1 | 4/2007 | Johnson |
| 2007/0084791 A1 | 4/2007 | Jordan et al. |
| 2007/0084795 A1 | 4/2007 | Jordan |
| 2007/0108125 A1 | 5/2007 | Cho et al. |
| 2007/0131614 A1 | 6/2007 | Knappe et al. |
| 2007/0138090 A1 | 6/2007 | Jordan et al. |
| 2007/0170112 A1 | 7/2007 | Elefritz et al. |
| 2007/0227973 A1 | 10/2007 | Zha et al. |
| 2008/0053923 A1 | 3/2008 | Beck et al. |
| 2008/0093297 A1 | 4/2008 | Gock et al. |
| 2008/0156745 A1 | 7/2008 | Zha et al. |

(56) References Cited

U.S. PATENT DOCUMENTS

| | | | |
|---|---|---|---|
| 2008/0179249 A1 | 7/2008 | Beck et al. | |
| 2008/0190846 A1 | 8/2008 | Cox et al. | |
| 2008/0203016 A1 | 8/2008 | Johnson et al. | |
| 2008/0203017 A1 | 8/2008 | Zha et al. | |
| 2008/0257822 A1 | 10/2008 | Johnson | |
| 2008/0277340 A1 | 11/2008 | Hong et al. | |
| 2009/0001018 A1 | 1/2009 | Zha et al. | |
| 2009/0194477 A1 | 8/2009 | Hashimoto | |
| 2009/0223895 A1 | 9/2009 | Zha et al. | |
| 2009/0255873 A1 | 10/2009 | Biltoft et al. | |
| 2010/0000941 A1 | 1/2010 | Muller | |
| 2010/0012585 A1 | 1/2010 | Zha et al. | |
| 2010/0025320 A1 | 2/2010 | Johnson | |
| 2010/0051545 A1 | 3/2010 | Johnson et al. | |
| 2010/0170847 A1 | 7/2010 | Zha et al. | |
| 2010/0200503 A1 | 8/2010 | Zha et al. | |
| 2010/0300968 A1 | 12/2010 | Liu et al. | |
| 2010/0326906 A1 | 12/2010 | Barnes | |
| 2011/0023913 A1 | 2/2011 | Fulling | |
| 2011/0049047 A1 | 3/2011 | Cumin et al. | |
| 2011/0049048 A1* | 3/2011 | Benner et al. | 210/636 |
| 2011/0056522 A1 | 3/2011 | Zauner et al. | |
| 2011/0100907 A1 | 5/2011 | Zha et al. | |
| 2011/0114557 A2 | 5/2011 | Johnson et al. | |
| 2011/0127209 A1 | 6/2011 | Rogers et al. | |
| 2011/0132826 A1 | 6/2011 | Muller et al. | |
| 2011/0139715 A1 | 6/2011 | Zha et al. | |
| 2011/0192783 A1 | 8/2011 | Cox et al. | |
| 2011/0198283 A1 | 8/2011 | Zha et al. | |
| 2012/0074053 A1 | 3/2012 | Collignon et al. | |
| 2012/0091602 A1 | 4/2012 | Cumin et al. | |
| 2012/0187044 A1 | 7/2012 | Zha et al. | |
| 2012/0285885 A1 | 11/2012 | James et al. | |
| 2013/0037467 A1 | 2/2013 | Biltoft et al. | |
| 2013/0056426 A1 | 3/2013 | Barnes | |
| 2013/0153496 A1 | 6/2013 | Zha et al. | |

FOREIGN PATENT DOCUMENTS

| | | |
|---|---|---|
| AU | 77066/87 A | 2/1988 |
| AU | 762091 B2 | 6/2003 |
| AU | 2004289373 A1 | 5/2005 |
| CA | 2460207 A1 | 3/2003 |
| CA | 2531764 A1 | 3/2005 |
| CN | 86104888 A | 2/1988 |
| CN | 1050770 | 1/1995 |
| CN | 2204898Y Y | 8/1995 |
| CN | 2236049 Y | 9/1996 |
| CN | 1159769 A | 9/1997 |
| CN | 1244814 A | 2/2000 |
| CN | 1249698 A | 4/2000 |
| CN | 1265636 A | 9/2000 |
| CN | 1319032 A | 10/2001 |
| CN | 1468140 A | 1/2004 |
| CN | 1541757 A | 11/2004 |
| DE | 3904544 A1 | 8/1990 |
| DE | 4117281 A1 | 1/1992 |
| DE | 4113420 A1 | 10/1992 |
| DE | 4117422 C1 | 11/1992 |
| DE | 4326603 A1 | 2/1995 |
| DE | 19503060 A1 | 8/1996 |
| DE | 29804927 U1 | 6/1998 |
| DE | 29906389 U1 | 6/1999 |
| DE | 10045227 C1 | 2/2002 |
| DE | 10209170 C1 | 8/2003 |
| DE | 202004012693 U1 | 10/2004 |
| EP | 012557 B1 | 2/1983 |
| EP | 126714 A2 | 11/1984 |
| EP | 050447 B1 | 10/1985 |
| EP | 194735 A2 | 9/1986 |
| EP | 250337 A1 | 12/1987 |
| EP | 327025 A1 | 8/1989 |
| EP | 344633 A1 | 12/1989 |
| EP | 090383 B1 | 5/1990 |
| EP | 407900 A2 | 1/1991 |
| EP | 463627 A2 | 1/1992 |
| EP | 0464321 A1 | 1/1992 |
| EP | 492942 A2 | 7/1992 |
| EP | 518250 B1 | 12/1992 |
| EP | 547575 A1 | 6/1993 |
| EP | 280052 B1 | 7/1994 |
| EP | 395133 B1 | 2/1995 |
| EP | 662341 A1 | 7/1995 |
| EP | 492446 B1 | 11/1995 |
| EP | 430082 B1 | 6/1996 |
| EP | 734758 A1 | 10/1996 |
| EP | 763758 A1 | 3/1997 |
| EP | 824956 A2 | 2/1998 |
| EP | 848194 A2 | 6/1998 |
| EP | 855214 A1 | 7/1998 |
| EP | 627255 B1 | 1/1999 |
| EP | 911073 A1 | 4/1999 |
| EP | 920904 A2 | 6/1999 |
| EP | 0937494 A2 | 8/1999 |
| EP | 1034835 A1 | 9/2000 |
| EP | 1052012 A1 | 11/2000 |
| EP | 1156015 A1 | 11/2001 |
| EP | 1300186 A1 | 4/2003 |
| EP | 1349644 B1 | 10/2003 |
| EP | 1350555 A1 | 10/2003 |
| EP | 1236503 B1 | 8/2004 |
| EP | 1445240 | 8/2004 |
| EP | 1466658 A1 | 10/2004 |
| EP | 1659171 A1 | 5/2006 |
| EP | 1420874 B1 | 1/2011 |
| FR | 2620712 A1 | 3/1989 |
| FR | 2674448 A1 | 10/1992 |
| FR | 2699424 A1 | 6/1994 |
| FR | 2762834 A1 | 11/1998 |
| GB | 702911 A | 1/1954 |
| GB | 996195 A | 6/1965 |
| GB | 2253572 A | 9/1992 |
| JP | 52-078677 A | 7/1977 |
| JP | 53-5077 | 1/1978 |
| JP | 53108882 A | 9/1978 |
| JP | 54162684 A | 12/1979 |
| JP | 55099703 A | 7/1980 |
| JP | 55129107 A | 10/1980 |
| JP | 55129155 A | 10/1980 |
| JP | 56021604 A | 2/1981 |
| JP | 56118701 A | 9/1981 |
| JP | 56121685 A | 9/1981 |
| JP | 57190697 A | 11/1982 |
| JP | 58088007 A | 5/1983 |
| JP | 60019002 A | 1/1985 |
| JP | 60-206412 A | 10/1985 |
| JP | 60260628 A | 12/1985 |
| JP | 61097005 A | 5/1986 |
| JP | 61097006 A | 5/1986 |
| JP | 61107905 A | 5/1986 |
| JP | 61167406 A | 7/1986 |
| JP | 61167407 A | 7/1986 |
| JP | 61171504 A | 8/1986 |
| JP | 61192309 A | 8/1986 |
| JP | 61222510 A | 10/1986 |
| JP | 61242607 A | 10/1986 |
| JP | 61249505 A | 11/1986 |
| JP | 61257203 A | 11/1986 |
| JP | 61263605 A | 11/1986 |
| JP | 61291007 A | 12/1986 |
| JP | 61293504 A | 12/1986 |
| JP | 62004408 A | 1/1987 |
| JP | 62068828 A | 3/1987 |
| JP | 62114609 A | 5/1987 |
| JP | 62140607 A | 6/1987 |
| JP | 62144708 A | 6/1987 |
| JP | 62163708 A | 7/1987 |
| JP | 62179540 A | 8/1987 |
| JP | 62237908 A | 10/1987 |
| JP | 62250908 A | 10/1987 |
| JP | 62262710 A | 11/1987 |
| JP | S62187606 | 11/1987 |
| JP | 63-93307 | 4/1988 |

(56) References Cited

FOREIGN PATENT DOCUMENTS

| | | |
|---|---|---|
| JP | 63097634 A | 4/1988 |
| JP | 63099246 A | 4/1988 |
| JP | 63143905 A | 6/1988 |
| JP | 63-1602 | 7/1988 |
| JP | 63171607 A | 7/1988 |
| JP | 63180254 A | 7/1988 |
| JP | S63-38884 | 10/1988 |
| JP | 64-075542 A | 3/1989 |
| JP | 1-501046 T | 4/1989 |
| JP | 1111494 A | 4/1989 |
| JP | 01151906 A | 6/1989 |
| JP | 01-307409 A | 12/1989 |
| JP | 02-017925 | 1/1990 |
| JP | 02017924 | 1/1990 |
| JP | 02026625 A | 1/1990 |
| JP | 02031200 A | 2/1990 |
| JP | 02040296 A | 2/1990 |
| JP | 02107318 A | 4/1990 |
| JP | 02126922 A | 5/1990 |
| JP | 02144132 A | 6/1990 |
| JP | 02164423 A | 6/1990 |
| JP | 02174918 A | 7/1990 |
| JP | 02241523 A | 9/1990 |
| JP | 02277528 A | 11/1990 |
| JP | 02284035 A | 11/1990 |
| JP | 03018373 A | 1/1991 |
| JP | 03028797 A | 2/1991 |
| JP | 03-086529 A | 4/1991 |
| JP | 03110445 A | 5/1991 |
| JP | 04108518 A | 4/1992 |
| JP | 04110023 A | 4/1992 |
| JP | 4-190889 A | 7/1992 |
| JP | 04187224 A | 7/1992 |
| JP | 4-256425 A | 9/1992 |
| JP | 04250898 A | 9/1992 |
| JP | 04256424 A | 9/1992 |
| JP | 04265128 A | 9/1992 |
| JP | 04293527 A | 10/1992 |
| JP | 04310223 A | 11/1992 |
| JP | 04317793 A | 11/1992 |
| JP | 04334530 A | 11/1992 |
| JP | 04348252 A | 12/1992 |
| JP | 05023557 A | 2/1993 |
| JP | 05096136 A | 4/1993 |
| JP | 05137977 A | 6/1993 |
| JP | 05157654 A | 6/1993 |
| JP | 05161831 A | 6/1993 |
| JP | 05184884 A | 7/1993 |
| JP | 05279447 A | 10/1993 |
| JP | 05285348 A | 11/1993 |
| JP | 05305221 A | 11/1993 |
| JP | H05305221 A | 11/1993 |
| JP | 06-027215 A | 2/1994 |
| JP | 06071120 A | 3/1994 |
| JP | 06114240 A | 4/1994 |
| JP | 06170364 A | 6/1994 |
| JP | 06190250 A | 7/1994 |
| JP | 06218237 A | 8/1994 |
| JP | 06238273 A | 8/1994 |
| JP | 06-292820 A | 10/1994 |
| JP | 06277469 A | 10/1994 |
| JP | 06285496 A | 10/1994 |
| JP | 06343837 A | 12/1994 |
| JP | 07000770 A | 1/1995 |
| JP | 07024272 A | 1/1995 |
| JP | 07047247 A | 2/1995 |
| JP | 07068139 A | 3/1995 |
| JP | 07136470 A | 5/1995 |
| JP | 07136471 A | 5/1995 |
| JP | 07155564 A | 6/1995 |
| JP | 07155758 A | 6/1995 |
| JP | 7-39921 | 7/1995 |
| JP | 07178323 A | 7/1995 |
| JP | 07185268 A | 7/1995 |
| JP | 07185270 A | 7/1995 |
| JP | 07185271 A | 7/1995 |
| JP | 07185272 A | 7/1995 |
| JP | 07204635 A | 8/1995 |
| JP | 07236819 A | 9/1995 |
| JP | 07-256253 | 10/1995 |
| JP | 07251043 A | 10/1995 |
| JP | 07275665 A | 10/1995 |
| JP | 07289860 A | 11/1995 |
| JP | 07303895 A | 11/1995 |
| JP | 07313973 A | 12/1995 |
| JP | 08010585 A | 1/1996 |
| JP | 8039089 A | 2/1996 |
| JP | 08197053 A | 8/1996 |
| JP | 08323161 A | 12/1996 |
| JP | 08332357 A | 12/1996 |
| JP | 09000890 A | 1/1997 |
| JP | 09038470 A | 2/1997 |
| JP | 09038648 A | 2/1997 |
| JP | 09072993 A | 3/1997 |
| JP | 09075689 A | 3/1997 |
| JP | 09099227 A | 4/1997 |
| JP | 09103655 A | 4/1997 |
| JP | 09103661 A | 4/1997 |
| JP | 9117647 A | 5/1997 |
| JP | 9138298 A | 5/1997 |
| JP | 09141063 A | 6/1997 |
| JP | 09155345 A | 6/1997 |
| JP | 09187628 A | 7/1997 |
| JP | 09192458 A | 7/1997 |
| JP | 09220569 A | 8/1997 |
| JP | 09271641 A | 10/1997 |
| JP | 09313902 A | 12/1997 |
| JP | 09324067 A | 12/1997 |
| JP | 10015365 A | 1/1998 |
| JP | 10024222 A | 1/1998 |
| JP | 10033955 A | 2/1998 |
| JP | 10048466 A | 2/1998 |
| JP | 10066972 A | 3/1998 |
| JP | 10076144 A | 3/1998 |
| JP | 10076264 A | 3/1998 |
| JP | 10085562 A | 4/1998 |
| JP | 10085565 A | 4/1998 |
| JP | 10085566 A | 4/1998 |
| JP | 10156149 A | 6/1998 |
| JP | 10180048 A | 7/1998 |
| JP | 10225685 A | 8/1998 |
| JP | 10235168 A | 9/1998 |
| JP | 10249171 A | 9/1998 |
| JP | H10235168 A | 9/1998 |
| JP | 10286441 A | 10/1998 |
| JP | 10328538 A | 12/1998 |
| JP | 11005023 A | 1/1999 |
| JP | 11028339 A | 2/1999 |
| JP | 11028467 A | 2/1999 |
| JP | 11031025 A | 2/1999 |
| JP | 11033365 A | 2/1999 |
| JP | 11033367 A | 2/1999 |
| JP | 11076769 A | 3/1999 |
| JP | 11076770 A | 3/1999 |
| JP | 11090189 A | 4/1999 |
| JP | 11156166 A | 6/1999 |
| JP | 11156360 A | 6/1999 |
| JP | 11165200 A | 6/1999 |
| JP | 11179171 A | 7/1999 |
| JP | 11300177 A | 11/1999 |
| JP | 11302438 A | 11/1999 |
| JP | 11309351 A | 11/1999 |
| JP | 11319501 A | 11/1999 |
| JP | 11319507 A | 11/1999 |
| JP | 11333265 A | 12/1999 |
| JP | 2000000439 A | 1/2000 |
| JP | 200051670 | 2/2000 |
| JP | 2000051669 A | 2/2000 |
| JP | 2000061466 A | 2/2000 |
| JP | 200079390 A | 3/2000 |
| JP | 2000070684 A | 3/2000 |
| JP | 2000-093758 | 4/2000 |
| JP | 2000-157845 | 6/2000 |
| JP | 2000157850 A | 6/2000 |

(56) References Cited

FOREIGN PATENT DOCUMENTS

| | | |
|---|---|---|
| JP | 2000185220 A | 7/2000 |
| JP | 2000189958 A | 7/2000 |
| JP | 2000233020 A | 8/2000 |
| JP | 2000237548 A | 9/2000 |
| JP | 2000300968 A | 10/2000 |
| JP | 2000317276 A | 11/2000 |
| JP | 2000334276 A | 12/2000 |
| JP | 2000342932 A | 12/2000 |
| JP | 2001009246 A | 1/2001 |
| JP | 2001070967 | 3/2001 ............... C02F 3/08 |
| JP | 2001079366 A | 3/2001 |
| JP | 2001079367 A | 3/2001 |
| JP | 2001104760 A | 4/2001 |
| JP | 2001120963 A | 5/2001 |
| JP | 2001-510396 T | 7/2001 |
| JP | 2001179059 A | 7/2001 |
| JP | 2001179060 A | 7/2001 |
| JP | 2001190937 A | 7/2001 |
| JP | 2001190938 A | 7/2001 |
| JP | 2001205055 A | 7/2001 |
| JP | 2001212587 A | 8/2001 |
| JP | 2001232160 A | 8/2001 |
| JP | 2001-269546 | 10/2001 |
| JP | 2002011472 A | 1/2002 |
| JP | 2002143849 A | 5/2002 |
| JP | 2002177746 A | 6/2002 |
| JP | 3302992 B2 | 7/2002 |
| JP | 2002-527229 A | 8/2002 |
| JP | 2002525197 T | 8/2002 |
| JP | 2002263407 A | 9/2002 |
| JP | 2002-336663 | 11/2002 |
| JP | 2003024751 | 1/2003 |
| JP | 2003047830 A | 2/2003 |
| JP | 2003053157 A | 2/2003 |
| JP | 2003053160 A | 2/2003 |
| JP | 200371254 A | 3/2003 |
| JP | 2003062436 A | 3/2003 |
| JP | 2003135935 A | 5/2003 |
| JP | 2003190976 A | 7/2003 |
| JP | 2003-265597 | 9/2003 |
| JP | 2003-275548 A | 9/2003 |
| JP | 2003266072 A | 9/2003 |
| JP | 2003275759 A | 9/2003 |
| JP | 2003340250 A | 12/2003 |
| JP | 2004-008981 | 1/2004 |
| JP | 2004073950 A | 3/2004 |
| JP | 2004-230287 A | 8/2004 |
| JP | 2004216263 A | 8/2004 |
| JP | 2004230280 A | 8/2004 |
| JP | 2004249168 A | 9/2004 |
| JP | 2004322100 A | 11/2004 |
| JP | 2004-536710 A | 12/2004 |
| JP | 2004337730 A | 12/2004 |
| JP | 2005-502467 A | 1/2005 |
| JP | 2005-087887 A | 4/2005 |
| JP | 2005144291 A | 6/2005 |
| JP | 2005154551 A | 6/2005 |
| JP | 2005279447 A | 10/2005 |
| JP | 2006-116495 | 5/2006 |
| JP | 2007-547083 | 8/2010 |
| JP | 4833353 B2 | 12/2011 |
| KR | 20-0232145 | 7/2001 |
| KR | 1020020067227 | 8/2002 |
| KR | 20-0295350 | 11/2002 |
| KR | 2002-0090967 | 12/2002 |
| KR | 2003-033812 | 5/2003 |
| KR | 2003-060625 | 7/2003 |
| KR | 2005-063478 | 6/2005 |
| NL | 1006390 C2 | 12/1998 |
| NL | 1020491 C | 10/2003 |
| NL | 1021197 C | 10/2003 |
| NO | 20053769 A | 2/2006 |
| NZ | 510394 A | 5/2003 |
| NZ | 537874 A | 2/2007 |
| TW | 347343 | 12/1998 |
| WO | 8501449 A1 | 4/1985 |
| WO | 8605116 A1 | 9/1986 |
| WO | 8605705 A1 | 10/1986 |
| WO | 8800494 A1 | 1/1988 |
| WO | 8801529 A1 | 3/1988 |
| WO | 8801895 A1 | 3/1988 |
| WO | 8806200 A1 | 8/1988 |
| WO | 8900880 A1 | 2/1989 |
| WO | 9000434 A1 | 1/1990 |
| WO | 9104783 A1 | 4/1991 |
| WO | 9116124 A1 | 10/1991 |
| WO | 9302779 A1 | 2/1993 |
| WO | 9315827 A1 | 8/1993 |
| WO | 9323152 A1 | 11/1993 |
| WO | 9411094 A1 | 5/1994 |
| WO | 9511736 A1 | 5/1995 |
| WO | 9534424 A1 | 12/1995 |
| WO | 9603202 A1 | 2/1996 |
| WO | 9607470 A1 | 3/1996 |
| WO | 9628236 A1 | 9/1996 |
| WO | 9629142 A1 | 9/1996 |
| WO | 9641676 A1 | 12/1996 |
| WO | 9706880 A2 | 2/1997 |
| WO | 9822204 A1 | 5/1998 |
| WO | 9825694 A1 | 6/1998 |
| WO | 9828066 A1 | 7/1998 |
| WO | 9853902 A1 | 12/1998 |
| WO | 9901207 A1 | 1/1999 |
| WO | 99-55448 A1 | 11/1999 |
| WO | 9959707 A1 | 11/1999 |
| WO | 0018498 A1 | 4/2000 |
| WO | 0030742 A1 | 6/2000 |
| WO | 0100307 A2 | 1/2001 |
| WO | 0105715 A1 | 1/2001 |
| WO | 0108790 A1 | 2/2001 |
| WO | 0119414 A1 | 3/2001 |
| WO | 0132299 A1 | 5/2001 |
| WO | 0136075 A1 | 5/2001 |
| WO | 0143856 A1 | 6/2001 |
| WO | 0145829 A1 | 6/2001 |
| WO | 0226363 A2 | 4/2002 |
| WO | 0230550 A1 | 4/2002 |
| WO | 0240140 A1 | 5/2002 |
| WO | 0247800 A1 | 6/2002 |
| WO | 03000389 A2 | 1/2003 |
| WO | 03013706 A1 | 2/2003 |
| WO | 03024575 A1 | 3/2003 |
| WO | 03053552 A1 | 7/2003 |
| WO | 03057632 A1 | 7/2003 |
| WO | 03059495 A1 | 7/2003 |
| WO | 03068374 A1 | 8/2003 |
| WO | 03095078 A1 | 11/2003 |
| WO | 2004018084 A1 | 3/2004 |
| WO | 2004024304 A2 | 3/2004 |
| WO | 2004033078 A1 | 4/2004 |
| WO | 2004050221 A1 | 6/2004 |
| WO | 2004056458 A3 | 7/2004 |
| WO | 2004078327 A1 | 9/2004 |
| WO | 2004101120 A1 | 11/2004 |
| WO | 2005005028 A1 | 1/2005 |
| WO | 2005021140 A1 | 3/2005 |
| WO | 2005028085 A1 | 3/2005 |
| WO | 2005028086 A1 | 3/2005 |
| WO | 2005037414 A1 | 4/2005 |
| WO | 2005046849 A1 | 5/2005 |
| WO | 2005077499 A1 | 8/2005 |
| WO | 2005082498 A1 | 9/2005 |
| WO | 2005107929 A2 | 11/2005 |
| WO | 2006026814 A1 | 3/2006 |
| WO | 2006029456 A1 | 3/2006 |
| WO | 2006029465 | 3/2006 |
| WO | 2006047814 A1 | 5/2006 |
| WO | 2006066350 A1 | 6/2006 |
| WO | 2007053528 A2 | 5/2007 |
| WO | 2007065956 A1 | 6/2007 |
| WO | 2007135087 A1 | 11/2007 |
| WO | 2008025077 A1 | 3/2008 |
| WO | 2008034570 A1 | 3/2008 |
| WO | 2008071516 A1 | 6/2008 |

(56) References Cited

FOREIGN PATENT DOCUMENTS

| WO | 2008141080 A1 | 11/2008 |
|---|---|---|
| WO | 2008153818 A1 | 12/2008 |
| WO | 2009030405 A1 | 3/2009 |

OTHER PUBLICATIONS

"Water Encyclopedia", edited by Jay Lehr, published by John Wiley & Sons, Inc., Hoboken, New Jersey, 2005. Available at http://wwwmmrw.interscience.wiley.com/eow/.*
"Chemical Cleaning Definition", Lenntech BV, Lenntech Water treatment & purification Holding B.V., Chemical Cleaning.
Mark et al., "Peroxides and Peroxy Compounds, Inorganic" Kirk—Othmer Encyclopedia of Chemical Technology, Peroxides and Peroxy Compounds, Inorganic, To Piping Systems, New York, Wiley & Sons, Ed., Jan. 1, 1978, pp. 14-18.
Webster's Ninth New Collegiate Dictionary, Merriam-Webster Inc., Publishers, Springfield, Massachusetts, USA, Copyright 1986, p. 1298.
Coulson et al., "Coulson and Richardson's Chemical Engineering," 1999, vol. 1, pp. 358-364.
Cui et al., "Airlift crossflow membrane filtration—a feasibility study with dextran ultrafiltration," J. Membrane Sci. (1997) vol. 128, pp. 83-91.
Almulla et al., Desalination, 153 (2002), pp. 237-243.
Anonymous, "Nonwoven Constructions of Dyneon "THV and Dyneon "The Fluorothermoplastics", Research Disclosure Journal, Apr. 1999, RD 420013, 2 pages.
Cote et al., Wat. Sci. Tech. 38(4-5) (1998), pp. 437-442.
Cote, et al. "A New Immersed Membrane for Pretreatment to Reverse Osmosis" Desalination 139 (2001) 229-236.
Craig, Jones, "Applications of Hydrogen Peroxide and Derivatives," The Royal Society of Chemistry, Cambridge, UK 1999 Chapters 2 and 5.
Crawford et al., "Procurement of Membrane Equipment: Differences Between Water Treatment and Membrane Bioreactor (MBR) Applications" (2003).
Davis et al., Membrane Technology Conference, "Membrane Bioreactor Evaluation for Water Reuse in Seattle, Washington" (2003).
DeCarolis et al., Membrane Technology Conference, "Optimization of Various MBR Systems for Water Reclamation" (2003).
Delgrange-Vincent, N. et al., Desalination 131 (2000) 353-362.
Dow Chemicals Company, "Filmtec Membranes—Cleaning Procedures for Filmtec FT30 Elements," Tech Facts, Online, Jun. 30, 2000, XP002237568.
Husain, H. et al., "The ZENON experience with membrane bioreactors for municipal wastewater treatment," MBR2: Membr. Bioreact. Wastewater Treat., 2nd Intl. Meeting; School of Water Sciences, Cranfield University, Cranfield, UK, Jun. 1999.
Johnson, "Recent Advances in Microfiltration for Drinking Water Treatment," AWWA Annual Conference, Jun. 20-24, 1999, Chicago, Illinois, entire publication.
Kaiya et al., "Water Purification Using Hollow Fiber Microfiltration Membranes," 6th World Filtration Congress, Nagoya, 1993, pp. 813-816.
Kang et al. "Characteristics of microfiltration membranes in a membrane coupled sequencing batch reactor system" Water Research, Elsevier, Amsterdam, NL, vol. 37, No. 5, Mar. 2003.
Lloyd, D.R. et al. "Microporous Membrane Formation Via Thermally Induced Phase Separation/Solid-Liquid Phase Separation" Journal of Membrane Science (Sep. 15, 1990), pp. 239-261, vol. 52, No. 3, Elsevier Scientific Publishing Company, Amsterdam, NL.
Lozier et al., "Demonstration Testing of ZenoGem and Reverse Osmosis for Indirect Potable Reuse Final Technical Report," published by CH2M Hill, available from the National Technical Information Service, Operations Division, Jan. 2000, entire publication.
MicroCTM—Carbon Source for Wastewater Denitrification. Information from Environmental Operating Solutions website including MSDS.
Nakayama, "Introduction to Fluid Mechanics," Butterworth-Heinemann, Oxford, UK, 2000.
Ramaswammy S. et al. "Fabrication of Ply (ECTFE) Membranes via thermally induced phase Separation", Journal of Membrane Science, (Dec. 1, 2002), pp. 175-180, vol. 210 No. 1, Scientific Publishing Company, Amsterdam, NL.
Rosenberger et al., Desalination, 151 (2002), pp. 195-200.
U.S. Appl. No. 60/278,007, filed Mar. 23, 2001.
Ueda et al., "Effects of Aeration on Suction Pressure in a Submerged Membrane Bioreactor," Wat. Res. vol. 31, No. 3, 1997, pp. 489-494.
White et al., The Chemical Engineering Journal, 52 (1993), pp. 73-77.
Yamamoto et al., Water Science Technology, vol. 2, pp, 43-54; 1989.
Yoon: "Important operational parameters of membrane bioreactor-sludge disintegration (MBR-SD) system for zero excess sludge production" Water Research, Elsevier, Amsterdam, NL, vol. 37, No. 8, Apr. 2003.
Zenon, "Proposal for ZeeWeed® Membrane Filtration Equipment System for the City of Westminster, Colorado, Proposal No. 479-99," Mar. 2000, entire publication.
International Search Report dated Aug. 24, 2005 for Application No. PCT/IB2005/051007.
International Preliminary Report on Patentability dated Aug. 2, 2006 for Application No. PCT/IB2005/051007.
Seawater, Wikipedia, http://en.wikipedia.org/wiki/Seawater, Jul. 15, 2007.
Domestic, Municipal, and Industrial Water Supply and Waste Disposal, Water Encyclopedia, Wiley-Interscience, John Wiley & Sons, Copyright 2005, pp. 87-92, 141-145, 169-170, 245-248, 254-257, 322-325, 457-470, 545-549, 626-631, 782-788, 808-814- 871-876.

* cited by examiner

PROCESS AND APPARATUS FOR PURIFYING IMPURE WATER USING MICROFILTRATION OR ULTRAFILTRATION IN COMBINATION WITH REVERSE OSMOSIS

FIELD OF THE INVENTION

The invention relates to a method and apparatus for the production of pure or potable water from impure water, brackish water or seawater. More particularly, the method and apparatus relate to the use of micro-filtration and/or ultrafiltration in combination with reverse osmosis.

BACKGROUND OF THE INVENTION

Many methods and devices are known in the prior art for producing drinking water from contaminated water or seawater.

Such prior art devices typically include a form of pre-filter, such as an ultrafiltration (UF) or micro-filtration (MF) unit or particulate matter pre-filter, in conjunction with a reverse osmosis filter. The pre-filter serves to remove particulate matter, such as organic and/or insoluble particulate matter and thus protects the reverse osmosis filter from destruction. The reverse osmosis filter acts to remove ionic components, such as dissolved salts from seawater.

One of the inherent problems in using UF or MF membrane filters to pre-filter water prior to reverse osmosis treatment is that such filters can become clogged with particulate matter. This is especially the case in those systems where the filtrate is extremely impure and/or in large volumes, which is particularly the case where seawater is being filtered. It therefore becomes necessary to clean such filters periodically and the simplest method of doing this is by backwashing the filters. Backwashing involves reversing the flow across the filter to force and solid or particulate matter which has become entrapped in the filter cavities back into suspension. Normally, a portion of the reverse osmosis feedwater, which as already passed through the UF or MF membrane, is used to backwash the membrane filter.

Usually only 50-90% of the reverse osmosis feed actually passes through the reverse osmosis membrane to become desalinated reverse osmosis product, i.e. potable water, so losses to backwashing are acceptable.

It is also known in the prior art to use the residual reverse osmosis feed that does not pass through the membrane i.e. the reverse osmosis reject or reverse osmosis concentrate as the backwash source for the membrane backwash. This is disclosed, for example in U.S. Pat. No. 6,120,688 where a portion of the reverse osmosis feed is redirected into a CIP (Cleaning In Place) tank which can from time to time be used to provide a flow to a micro-filtration module in a reverse direction to backwash the membranes.

However, there is an inherent problem with such an approach, namely that the reverse osmosis concentrate can form scales or particles due to the concentration effects of the reverse osmosis process. Alternatively, it is possible that there is biological growth on the reverse osmosis membrane surface which can likewise contaminate the reverse osmosis concentrate. Such particles or biological material could in fact foul the clean or filtrate side of the micro-filtration or ultrafiltration membranes of residual reverse osmosis feed is used directly to backwash the micro-filtration or ultrafiltration membranes.

It is an object of the present invention to overcome or ameliorate at least one of the disadvantages of the prior art, or to provide a useful alternative.

Any discussion of the prior art throughout the specification should in no way be considered as an admission that such prior art is widely known or forms part of common general knowledge in the field.

SUMMARY OF THE INVENTION

According to a first aspect, the invention provides a method of purifying impure water contaminated with a filterable impurity and a dissolved impurity, the method comprising the steps of:

providing impure water to a primary microfiltration or ultrafiltration unit to remove the filterable impurity and produce impure filtered water contaminated with a dissolved impurity;

providing the impure filtered water contaminated with a dissolved impurity to a reverse osmosis unit to produce a potable water stream and a residual reverse osmosis stream; and treating the residual reverse osmosis stream prior to reuse.

Preferably the residual reverse osmosis stream is treated prior to reuse to backwash the primary microfiltration or ultrafiltration unit.

Preferably the residual reverse osmosis stream is treated prior to reuse by being passed through a secondary filter. The secondary filter is preferably a microfiltration or ultrafiltration membrane, and may be in the form of a cartridge, sand, pre-coat, or other media filter. The secondary filter may be disposable, or it may be backwashed or backwashable.

Preferably the residual reverse osmosis feed is used to backwash the primary microfiltration or ultrafiltration unit and is subject to ultrafiltration or microfiltration by a secondary ultrafiltration or microfiltration unit prior to said backwashing.

Preferably the secondary filter comprises multiple stages of filtration. More preferably the multiple stages of filtration include a first filtration through a coarse filter prior to filtration through a membrane filter.

Preferably the reverse osmosis reject is in controllable fluid communication with coarse backwashable filters such as single or multimedia filters, disc filters, diatomaceous earth filters, membrane filters, strainers, or screens.

As used herein, "insoluble impurities" include those typically found in sea water and other natural bodies of water, and include organic and inorganic matter, particulate matter, biological and non-biological matter etc. The term "dissolved impurities" includes for example, dissolved, soluble or solubilized organic or inorganic matter. Most typically, of course, in seawater the greatest quantity of these will be sodium ions and chloride ions.

The term "comprising" is used in an inclusive sense, i.e. "including", rather than in an exclusive sense, i.e. "consisting of".

The residual reverse osmosis stream may be treated prior to being reused, in addition to, or as an alternative to, being passed through a secondary microfiltration or ultrafiltration membrane, by one or any combination of the following treatments:

Chemical treatment, for example chlorination, fluorination, disinfection, scale control treatment, water softening (i.e. with lime), peroxide, sulfite/bisulfite, ozone or the like.

Radiation treatment, for example, UV, IR, microwave

Physical treatment, for example, ultrasonication or vortexing,

Other treatments, such as heat, electropreciptiation, magnetic treatments etc.

According to a second aspect the invention provides a method of purifying impure water, the method comprising the steps of providing a primary microfiltration unit, a reverse osmosis unit, said reverse osmosis in downstream fluid communication from said primary microfiltration or ultrafiltration unit, and a controllable fluid pathway for directing residual reverse osmosis feed to backwash said microfiltration unit and wherein the residual reverse osmosis feed is fierier subjected to ultrafiltration or microfiltration by a secondary ultrafiltration or microfiltration unit prior to a step of backwashing the primary ultrafiltration or microfiltration membrane.

Preferably the reverse osmosis reject used to backwash the filter has a suspended solids content of less than a predetermined quantity.

Preferably the reverse osmosis reject used to backwash the filter has a suspended solids content sufficient to allow it to be returned to the impure water source Preferably the reverse osmosis reject used to backwash the filter has a suspended solids content sufficient to allow it to be returned to the ocean Preferably the suspended solids content is controlled by controlling desalination recovery rate.

According to a third aspect the invention apparatus for purifying impure water contaminated with a filterable impurity and a dissolved impurity, the apparatus comprising:
  a primary microfiltration or ultrafiltration unit to remove the filterable impurity;
  a reverse osmosis unit to produce a potable water stream and a residual reverse osmosis stream;
  said reverse osmosis in downstream fluid communication from said primary microfiltration or ultrafiltration unit;
  a controllable fluid pathway to transfer impure filtered water contaminated with a dissolved impurity from the primary microfiltration or ultrafiltration unit to the reverse osmosis unit; and
  means for treating the residual reverse osmosis stream prior to reuse.

Preferably the residual reverse osmosis stream is directed by a controllable fluid pathway to backwash the primary microfiltration or ultrafiltration unit.

Preferably the residual reverse osmosis stream is directed by a controllable fluid pathway through a secondary microfiltration or ultrafiltration membrane to backwash the primary microfiltration or ultrafiltration unit.

Thus in another preferred aspect the invention provides apparatus for purifying impure water contaminated with a filterable impurity and a dissolved impurity, the apparatus comprising:
  a primary microfiltration or ultrafiltration unit to remove the filterable impurity;
  a reverse osmosis unit to produce a potable water stream and a residual reverse osmosis stream;
  said reverse osmosis unit in downstream fluid communication from said primary microfiltration or ultrafiltration unit;
  a controllable fluid pathway to transfer impure filtered water comprising a dissolved impurity from the primary microfiltration or ultrafiltration unit to the reverse osmosis unit; and
  a conduit to transfer a residual reverse osmosis stream from the reverse osmosis unit to backwash the primary microfiltration or ultrafiltration unit via a secondary microfiltration or ultrafiltration unit.

The apparatus may also include, in addition or alternatively to the above secondary microfiltration or ultrafiltration membrane, one or any combination of the following:

Ports for the introduction of chemical agents such as chlorination agents, fluorination agents, disinfecting agents, scale control treatment agents, water softening agents (i.e. with lime), peroxide, sulfite/bisulfite, or the like;
  Ports for the introduction of treatment gases, such as chlorine or ozone
  Irradiation means such as UV light, IR, microwave sources
  Ultrasonic generators, vortexing devices, heating elements, electroprecipitators, magnetics etc.

The present invention also provides a separate backwashable or disposable cartridge microfiltration or ultrafiltration system for filtering residual reverse osmosis feed that is used for micro-filtration or ultrafiltration backwash in order to prevent particulate fouling of the clean or filtrate side of the micro-filtration or ultrafiltration membrane.

Further, the invention provides in certain desalination applications, a method of filtration of the residual reverse osmosis feed which requires multiple stages of filtration. Such multiple stages include a first filtration through a coarse filter prior to filtration through a membrane filter and further allow the use of filtered residual reverse osmosis reject to backwash coarse backwashable filters such as single or multimedia filters, disc filters, diatomaceous earth filters, membrane filters, strainers, or screens.

Currently, filters used to remove suspended solids from water that is subsequently desalinated, must be oversized in order to provide adequate filtered water necessary to backwash or clean the filter. Using the waste stream from a reverse osmosis desalination process for filter backwash or cleaning allows for the construction of a smaller filtration system since it needs to only satisfy the reverse osmosis feed requirements.

Further, using reverse osmosis concentrate for filter backwash reduces the overall wastewater volume from the combined filter/reverse osmosis facility and makes possible a configuration that reduces or eliminates the amount of sludge. The cost involved in dealing with sludge is a significant contributor to the overall operations and maintenance costs of desalination plants. The sludge needs to be settled, thickened and dewatered. Due to high salt levels, it is not readily amenable to use as a soil treatment and so will require specialised transport and disposal.

In some circumstances where the desalination facility is permitted to discharge reverse osmosis concentrate back into the ocean or other receiving body of water it is usually permitted to allow a certain amount of suspended solids to be included in the wastewater typically 30-50 mg per liter. By using reverse osmosis concentrate for backwash of the filters it is possible to achieve direct discharge of the backwash waste with less than the permitted maximum suspended solids concentration.

To illustrate, a plant taking in a feed containing 20 mg/l and operating under a discharge permit of 40 mg/l would be able to operating at a nominal, and acceptable 50% recovery. Given that the total suspended solids are a function of the feed water, and that the discharge levels are regulated by permit, it would be possible to control the overall recovery of the plant such that the discharge levels would not be exceeded. The configuration of the present invention facilitates such a degree of control and may substantially eliminate, or at least provide significant savings in, suspended solids disposal costs.

The plant configuration of the present invention means that it is not necessary to use flocculants or coagulants which add significantly to sludge disposal costs.

DESCRIPTION OF THE INVENTION

Figure 1:
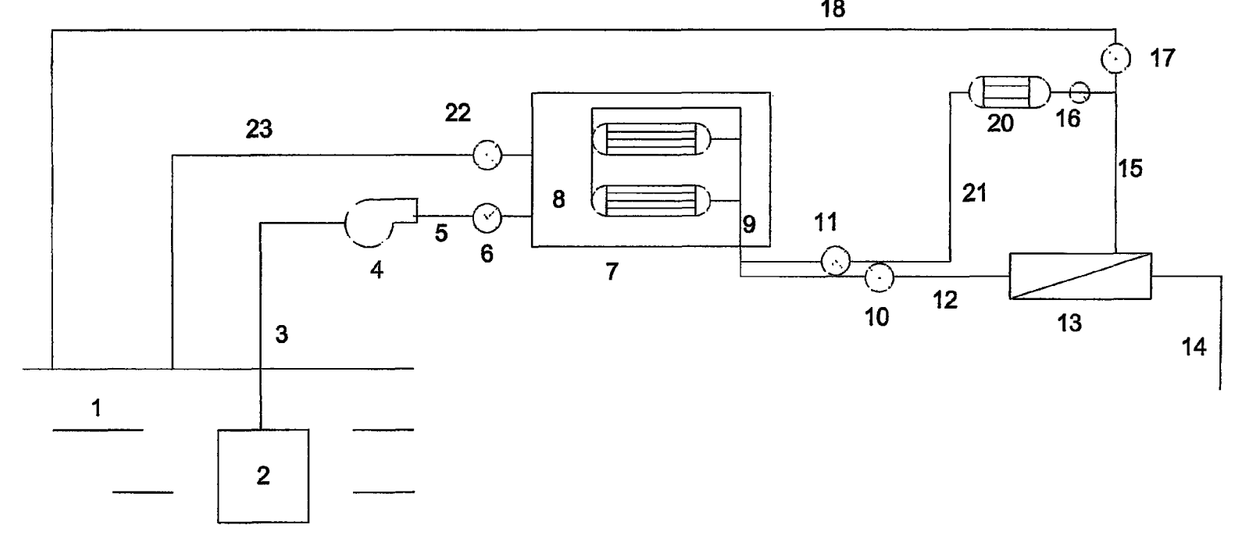

The invention will now be more particularly described with reference to the drawings. Specifically with reference to FIG.

1, Item 1 represents the brine which is to be filtered. The brine is taken in by way of a feeder pump 2, which moves the brine along line 3, through pump 4, along line 5 and through valve 6, which during filtration is open leading the seawater into primary microfiltration or ultrafiltration unit 7. Feeder pump 2 may also include a coarse or pre-filtration device. In primary microfiltration or ultrafiltration unit 7 are housed banks of modules of the type which have hollow fibres. The contaminated water passes along the outer side of the hollow fibres and produces clear water in the lumen of the fibres. The clear filtered water exits the primary micro-filtration or ultrafiltration unit at 9. In normal use, valve 10 is open and valve 11 is shut and the micro-filtered water, which is still saline, passes along line 12 to reverse osmosis unit 13. Reverse osmosis unit 13 desalinates the water and produces a desalinated stream of potable water 14 which can be collected for use. The residual, which includes a concentrated saline solution proceeds along line 15. In normal use valve 16 is shut and valve 17 is open and the concentrated saline solution moves along line 18 and back to be discharged into the brine.

During backwash mode valve 10 is shut and valve 11 is opened. Likewise valve 16 is open and valve 17 is shut. Thus, the reverse osmosis concentrate is forced along line 15, where upon it passes through a secondary micro-filtration or ultrafiltration unit 20 to produce a filtered saline solution which exits along line 21, moves through valve 11 and serves to backwash micro-filtration modules 8 because there is a positive pressure at 9 and one also at 5, and because valve 22 is open, the backwashed material which is dislodged from the filtration modules exits along line 23 and is returned to the brine solution.

It will be appreciated that when the material is operating in backwash mode, a source of pressure will be required to force the filtered concentrate back through the primary and secondary micro-filtration or ultrafiltration membrane modules for backwashing. This can be carried out in many ways. Reverse osmosis reject is often generally available at elevated pressures, and if this is the case, no additional separate pumping source is needed to deliver the reversed osmosis reject at a suitable pressure to backwash the membrane. However, if the reverse osmosis reject is not available at sufficient pressure to backwash the membrane, it may be supplemented, by way of, for preference, a reservoir and pump located along line 21. In this regard, the filtered saline solution is allowed to accumulate in a CIP tank. The presence of a further reservoir and pump along line 12 will allow the reverse osmosis unit to operate in a continuous fashion.

A further filter can be incorporated either in line 23 to catch the material produced by backwashing, which can be concentrated down to a much smaller volume of water for sludge disposal.

By following this process, suspended materials which accumulate on the saline side of the reverse osmosis process (the reverse osmosis reject) are prevented from ever contacting the filtration side of the primary ultrafiltration membranes. Secondary micro-filtration or ultrafiltration unit 20 can also have an additional unit for cleaning by backwashing. This could be cleaned by way of a separate reservoir along line 21 which could be reserved and the contaminate flushed out back along line 16, 17 and 18 and out to waste.

In an alternative embodiment, filter 20 can be a cartridge filter, which may be disposable or replaceable. Alternatively, 20 can be a microfiltration or ultrafiltration unit with a cartridge on the feed side.

The use of reverse osmosis reject for backwashing has further benefits. The difference in salinity between the feed to the primary microfiltration or ultrafiltration membrane and the reverse osmosis reject, which has a much higher concentration of ionic species provides an osmotic shock effect that can kill bacteria growing on the microfiltration or ultrafiltration membrane. Using reverse osmosis reject can thus have a disinfecting effect on the primary MF or UF membranes.

Further, in preferred embodiments, acidic components or scale dispersants are added to the reverse osmosis feed, but subsequent to prefiltration in order to prevent scale precipitation in the reverse osmosis membrane. Thus, in this way, the reverse osmosis concentrate has a lower scale formation potential than the reverse osmosis feed.

Additionally, other benefits may also be realised. The apparatus of the present invention may be fitted with a conventional sand based prefilters to screen out large particles which may damage the primary microfiltration or ultrafiltration membranes (such as small parts of crustacean shells). The sand in such prefilters often acts as a support for the growth of algae and other micro-organisms. Because of this, the feed water into the primary microfiltration or ultrafiltration units, or at the very least the backwash for the sand prefilters, has typically needed to be chlorinated, to kill algae and other micro-organisms dislodged form the sand. In the present invention, because the backwash quality is high, it can be used as freely as desired to wash the primary microfiltration or ultrafiltration membranes. Thus, by the further addition of bactericidal agents, such as chlorine to the reverse osmosis reject at any point, in conjunction (additively or more preferably synergistically) with the osmotic shock effect caused, very high bacterial kills and resultant low bacterial content of the system can be registered without the need to chlorinate large volumes of intake seawater.

The claims defining the invention are as follows:

1. A method of purifying impure water contaminated with a filterable impurity and a dissolved impurity, the method comprising:
    filtering the impure water in a primary microfiltration or ultrafiltration unit to remove the filterable impurity and produce impure filtered water contaminated with the dissolved impurity;
    directing the impure filtered water through a first fluid line fluidly connecting an impure filtered water outlet of the primary microfiltration or ultrafiltration unit to an inlet of a reverse osmosis unit;
    filtering the impure filtered water contaminated with the dissolved impurity in the reverse osmosis unit to produce a potable water stream and a residual reverse osmosis stream;
    directing the residual reverse osmosis stream into a second fluid line fluidly connecting a residual reverse osmosis stream outlet of the reverse osmosis unit to an inlet of a secondary microfiltration or ultrafiltration membrane filter;
    filtering the residual reverse osmosis stream by passing the stream through the secondary microfiltration or ultrafiltration membrane filter to produce a filtered saline solution;
    directing the filtered saline solution into a third fluid line fluidly connecting an outlet of the secondary microfiltration or ultrafiltration membrane filter to the impure filtered water outlet of the primary microfiltration or ultrafiltration unit;
    blocking flow of the filtered saline solution from the outlet of the secondary microfiltration or ultrafiltration membrane filter to the inlet of the reverse osmosis unit during backwashing of the primary microfiltration or ultrafiltration unit with the filtered saline solution by closing a valve in the first fluid line during backwashing of the primary microfiltration or ultrafiltration unit; and backwashing the primary microfiltration or ultrafiltration unit with the filtered saline solution.

2. The method according to claim 1 wherein the secondary microfiltration or ultrafiltration membrane filter is backwashed.

3. The method according to claim 1 wherein the secondary microfiltration or ultrafiltration membrane filter is a cartridge filter.

4. The method according to claim 3 wherein the secondary microfiltration or ultrafiltration membrane filter is backwashed.

5. The method according to claim 1 wherein the impure water is sea water.

6. The method according to claim 1 wherein the filterable impurity includes those typically found in sea water.

7. The method according to claim 1 wherein the dissolved impurity includes sodium ions and chloride ions.

8. The method according to claim 1 further comprising treating the residual reverse osmosis stream prior to backwashing by one or more of a chemical treatment, a radiation treatment or a physical treatment.

9. The method according claim 8 wherein the chemical treatment is selected from the group consisting of chlorination, fluorination, disinfection, scale control treatment, water softening, peroxide, sulfite/bisulfite, ozone and combinations thereof.

10. The method according to claim 8 wherein the radiation treatment is selected from the group consisting of UV, IR, microwave and combinations thereof.

11. The method according to claim 8 wherein the physical treatment is selected from the group consisting of ultrasonication, vortexing, and combinations thereof.

12. The method according to claim 8 wherein the treatment is selected from the group consisting of heat, electroprecipitation, magnetic treatment and combinations thereof.

13. The method according to claim 1 wherein filtering the residual reverse osmosis stream comprises filtering using multiple stages of filtration.

14. The method according to claim 13 wherein filtering the residual reverse osmosis stream comprises filtering through a coarse filter prior to filtering through the secondary microfiltration or ultrafiltration membrane filter.

15. The method according to claim 14 wherein the residual reverse osmosis stream is in controllable fluid communication with a coarse backwashable filter selected from the group consisting of a single or multimedia filter, a disc filter, a diatomaceous earth filter, a membrane filter, a strainer, a screen and combinations thereof.

16. A method of facilitating the purification of impure water, the method comprising:

providing a primary microfiltration or ultrafiltration unit to produce impure filtered water;

providing a first fluid circuit configured to direct the impure filtered water to an inlet of a reverse osmosis unit in downstream fluid communication from said primary microfiltration or ultrafiltration unit;

providing a second fluid circuit fluidly connecting a residual reverse osmosis stream outlet of the reverse osmosis unit to an inlet of a secondary microfiltration or ultrafiltration membrane filter, the second fluid circuit configured to direct a residual reverse osmosis stream from the reverse osmosis unit to the secondary microfiltration or ultrafiltration membrane filter to produce a filtered saline solution; and providing a controllable fluid pathway configured to direct the filtered saline solution from the secondary microfiltration or ultrafiltration membrane filter to the primary microfiltration or ultrafiltration unit to backwash the primary microfiltration or ultrafiltration unit, the first fluid circuit including a valve which prevents flow of the filtered saline solution from the secondary microfiltration or ultrafiltration membrane filter to the inlet of the reverse osmosis unit during backwashing of the primary microfiltration or ultrafiltration unit with the filtered saline solution.

17. A system for purifying impure water contaminated with a filterable impurity and a dissolved impurity, the system comprising:

a filtration system including:

a primary microfiltration or ultrafiltration unit configured to remove the filterable impurity;

a reverse osmosis unit configured to produce a potable water stream and a residual reverse osmosis stream, the reverse osmosis unit including an inlet in downstream fluid communication from the primary microfiltration or ultrafiltration unit; and a first controllable fluid pathway configured to transfer a stream of impure filtered water contaminated with a dissolved impurity from the primary microfiltration or ultrafiltration unit to the reverse osmosis unit; and a backwash system in fluid communication with a residual reverse osmosis stream outlet of the reverse osmosis unit and a permeate outlet of the primary microfiltration or ultrafiltration unit, and including:

a fluid line fluidly connecting the residual reverse osmosis stream outlet of the reverse osmosis unit to an inlet of a secondary microfiltration or ultrafiltration membrane filter, the secondary microfiltration or ultrafiltration membrane filter configured to filter the residual reverse osmosis stream to produce a filtered saline solution;

a second controllable fluid pathway configured to direct the filtered saline solution to backwash the primary microfiltration or ultrafiltration unit; and a valve disposed in the first controllable fluid pathway which blocks flow of the filtered saline solution from the secondary microfiltration or ultrafiltration membrane filter to the inlet of the reverse osmosis unit during backwashing of the primary microfiltration or ultrafiltration unit.

18. The system according to claim 17 further comprising one or any combination of ports for the introduction of chemical agents, irradiation means, ultrasonic generators, vortexing devices, heating elements, electroprecipitators and magnets.

19. The system according to claim 17 wherein the secondary microfiltration or ultrafiltration unit is a backwashable or disposable cartridge microfiltration or ultrafiltration system.

20. The system according to claim 17 wherein the secondary microfiltration or ultrafiltration unit comprises multiple stages of filtration.

21. The system according to claim 20 wherein the multiple stages of filtration include a first filtration through a coarse filter prior to filtration through the secondary microfiltration or ultrafiltration membrane filter.

22. The system according to claim 17 wherein the residual reverse osmosis stream is in controllable fluid communication with coarse backwashable filters selected from the group consisting of single or multimedia filters, disc filters, diatomaceous earth filters, membrane filters, strainers, and screens.

23. The method according to claim 1 wherein the secondary microfiltration or ultrafiltration membrane filter is fluidly connected downstream of the residual reverse osmosis stream outlet of the reverse osmosis unit but not fluidly connected upstream of the inlet of the reverse osmosis unit.

24. The method according to claim 16 wherein the secondary microfiltration or ultrafiltration membrane filter is fluidly connected downstream of the residual reverse osmosis stream outlet of the reverse osmosis unit but not fluidly connected upstream of the inlet of the reverse osmosis unit.

25. The system according to claim 17 wherein the secondary microfiltration or ultrafiltration membrane filter is fluidly connected downstream of the residual reverse osmosis stream outlet of the reverse osmosis unit but not fluidly connected upstream of the inlet of the reverse osmosis unit.

\* \* \* \* \*